US011340622B2

(12) United States Patent
Refaat et al.

(10) Patent No.: US 11,340,622 B2
(45) Date of Patent: May 24, 2022

(54) DETERMINING RESPECTIVE IMPACTS OF AGENTS

(71) Applicant: Waymo LLC, Mountain View, CA (US)

(72) Inventors: Khaled Refaat, Mountain View, CA (US); Kai Ding, Santa Clara, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 208 days.

(21) Appl. No.: 16/557,938

(22) Filed: Aug. 30, 2019

(65) Prior Publication Data

US 2021/0064044 A1 Mar. 4, 2021

(51) Int. Cl.
*G05D 1/02* (2020.01)
*G01C 21/34* (2006.01)

(52) U.S. Cl.
CPC ....... *G05D 1/0219* (2013.01); *G01C 21/3446* (2013.01); *G01C 21/3492* (2013.01); *G05D 1/0221* (2013.01)

(58) Field of Classification Search
CPC ............... G05D 1/0219; G05D 1/0221; G01C 21/3446; G01C 21/3492
See application file for complete search history.

(56) References Cited

U.S. PATENT DOCUMENTS

| | | | |
|---|---|---|---|
| 2014/0088855 A1 | 3/2014 | Ferguson | |
| 2015/0175168 A1 | 6/2015 | Hoye et al. | |
| 2018/0374359 A1 | 12/2018 | Li et al. | |
| 2019/0072973 A1 | 3/2019 | Sun et al. | |
| 2019/0250623 A1* | 8/2019 | Kentley-Klay | B60W 30/095 |
| 2019/0303759 A1* | 10/2019 | Farabet | G06K 9/4628 |
| 2020/0174490 A1* | 6/2020 | Ogale | G05D 1/0221 |

FOREIGN PATENT DOCUMENTS

JP     2015072650     4/2015

OTHER PUBLICATIONS

PCT International Search Report and Written Opinion in International Appln. No. PCT/US2020/047933, dated Nov. 27, 2020, 13 pages.

(Continued)

*Primary Examiner* — Rami Khatib
*Assistant Examiner* — Shahira Baajour
(74) *Attorney, Agent, or Firm* — Fish & Richardson P.C.

(57) ABSTRACT

Methods, systems, and apparatus, including computer programs encoded on a computer storage medium, for determining respective importance scores for a plurality of agents in a vicinity of an autonomous vehicle navigating through an environment. The respective importance scores characterize a relative impact of each agent on planned trajectories generated by a planning subsystem of the autonomous vehicle. In one aspect, a method comprises providing different states of an environment as input to the planning subsystem and obtaining as output from the planning subsystem corresponding planned trajectories. Importance scores for the one or more agents that are in one state but not in the other are determined based on a measure of difference between the planned trajectories.

18 Claims, 5 Drawing Sheets

(56) References Cited

OTHER PUBLICATIONS

Berndt et al., "Using Dynamic Time Warping to Find Patterns in Time Series," KDD Workshop, Jul. 1994, 359-370.
Ohn-Bar et al., "Are all objects equal? Deep spatiotemporal importance prediction in driving videos," Pattern Recognition, Apr. 2017, 64:425-436.
Tawari et al., "Learning to Attend to Salient Targets in Driving Videos Using Fully Convolutional RNN," 2018 21st International Conference on Intelligent Transportation Systems (ITSC), Nov. 2018, 3225-3232.

* cited by examiner

ENVIRONMENT 506A

ENVIRONMENT 506B

DETERMINING RESPECTIVE IMPACTS OF AGENTS

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on-board a vehicle that determines respective importance scores of agents in a vicinity of an autonomous vehicle navigating through an environment. The respective importance scores characterize a relative impact of each agent on planned trajectories generated by a planning subsystem of the autonomous vehicle.

In general, one innovative aspect of the subject matter described in this specification can be embodied in methods that include the actions of obtaining first state data characterizing a first state of the environment with a first set of agents being located within a vicinity of the autonomous vehicle; providing the first state data as input to the planning subsystem; obtaining as output from the planning subsystem a first planned trajectory for the autonomous vehicle; obtaining second state data characterizing a second state of the environment with a second set of agents being located within a vicinity of the autonomous vehicle, wherein the second set of agents includes (i) all of the agents that are in the first set of agents and (ii) one or more agents that are not in the first set of agents; providing the second state data as input to the planning subsystem; obtaining as output from the planning subsystem a second planned trajectory for the autonomous vehicle; determining a measure of a difference between the first and second planned trajectories; and determining, based at least in part on the determined measure of difference, corresponding importance score for the one or more agents that are in the second set of agents but not in the first set of agents.

In some implementations, the method further includes: obtaining third state data characterizing a third state of the environment with a third set of agents being located within a vicinity of the autonomous vehicle, wherein the third set of agents includes all of the agents that are in the first set of agents less one or more agents; providing the third state data as input to the planning subsystem; obtaining as output from the planning subsystem a third planned trajectory for the autonomous vehicle; determining a measure of a difference between the first and third planned trajectories; and determining, based at least on the determined measure of difference, corresponding importance score for the one or more agents that are in the first set of agents but not in the third set of agents.

In some implementations, the output of the importance scoring model includes the first and second states of the environment characterize a same scene in a vicinity of the vehicle except with different numbers of agents that are present in the scene.

In some implementations, the scene is either a simulated scene or a real world scene that is perceived by one or more sensors onboard the autonomous vehicle.

In some implementations, determining a measure of a difference between the first and second planned trajectories includes: determining a Euclidean distance between the first and second planned trajectories; determining a difference between respective costs of the first and second planned trajectories that are both generated by a cost-based planning subsystem; and determining respective differences between corresponding geometries and speeds of the first and second planned trajectories.

In some implementations, the methods further includes: providing data describing the agents and respective importance scores as training data to train an importance scoring subsystem onboard the autonomous vehicle, wherein the importance scoring subsystem is configured to identify the most important agents in a vicinity of the autonomous vehicle in real-time.

Particular embodiments of the subject matter described in this specification can be implemented so as to realize one or more of the following advantages. In order for a planning subsystem of a vehicle to generate planning decisions which cause the vehicle to travel along a safe and comfortable trajectory, the planning subsystem must be provided with timely and accurate prediction data (e.g., behavior, classification, and semantic prediction data) for agents in the vicinity of the vehicle. The agents may be, for example, pedestrians, bicyclists, or other vehicles. However, generating prediction data for an agent in the vicinity of the vehicle may require substantial computational resources (e.g., memory, computing power, or both). In certain situations, a large number of other agents in the environment may be in the vicinity of the vehicle (e.g., when the vehicle is traveling along a busy highway). In these situations, the limited computational resources available on-board the vehicle may be insufficient to generate timely prediction data for even only some of the agents in the vicinity of the vehicle.

The on-board system described in this specification can concentrate the limited computational resources available on-board the vehicle (e.g., memory, computing power, or both) on generating precise prediction data for only those agents which are likely to have the biggest impact on the planning decisions generated by the planning subsystem. The system can generate prediction data for the remaining low impact agents using a more computationally efficient prediction model. In this manner, the on-board system described in this specification can generate timely prediction data which enables the planning subsystem to generate planning decisions that cause the vehicle to travel along a safe and comfortable trajectory despite the limited computational resources available on-board the vehicle.

Specifically, the on-board system may use an importance scoring model that has been trained on corresponding training data to determine respective importance scores of agents in a vicinity of the vehicle. The respective importance scores characterize a relative impact of each agent on planned trajectories generated by the planning subsystem of the vehicle. Based on the importance scores, or, more precisely, the importance ranking of the agents that is derived from the importance scores, the system can identify one or more agents as high-impact agents.

However, training data for these importance scoring models is difficult to generate because at a given time point, multiple agents may be present in the vicinity of the vehicle, and their exact impacts on the planning decisions generated by a planning subsystem onboard the vehicle are likely to be neglected or incorrectly attributed. This specification, however, describes a technique of accurately determining respective impacts of the agents by incrementally processing different states of an environment. The determined impacts of agents are then used to generate high-quality training data for use in training these importance scoring models. In practice, this technique can be adopted in a wide range of agent impact estimation tasks without relying on the specifics of the planning subsystem. This helps broaden the scope of the applications of this technique to include use cases where the exact, internal implementations of a planning subsystem remain unidentified.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how to generate training data for use in training an importance scoring model that will be implemented onboard a vehicle to determine respective importance scores or rankings for agents in the vicinity of the vehicle. The importance score for an agent characterizes an estimated impact of the agent on planning decisions generated by a planning system of the vehicle which plan the future trajectory of the vehicle. The agents in the vicinity of the vehicle may be, for example, pedestrians, bicyclists, or other vehicles. To enable an on-board importance scoring model to accurately determine importance scores for agents, a training system trains the model on training data that is generated using an incremental processing technique. These features and other features are described in more detail below.

Figure 1:
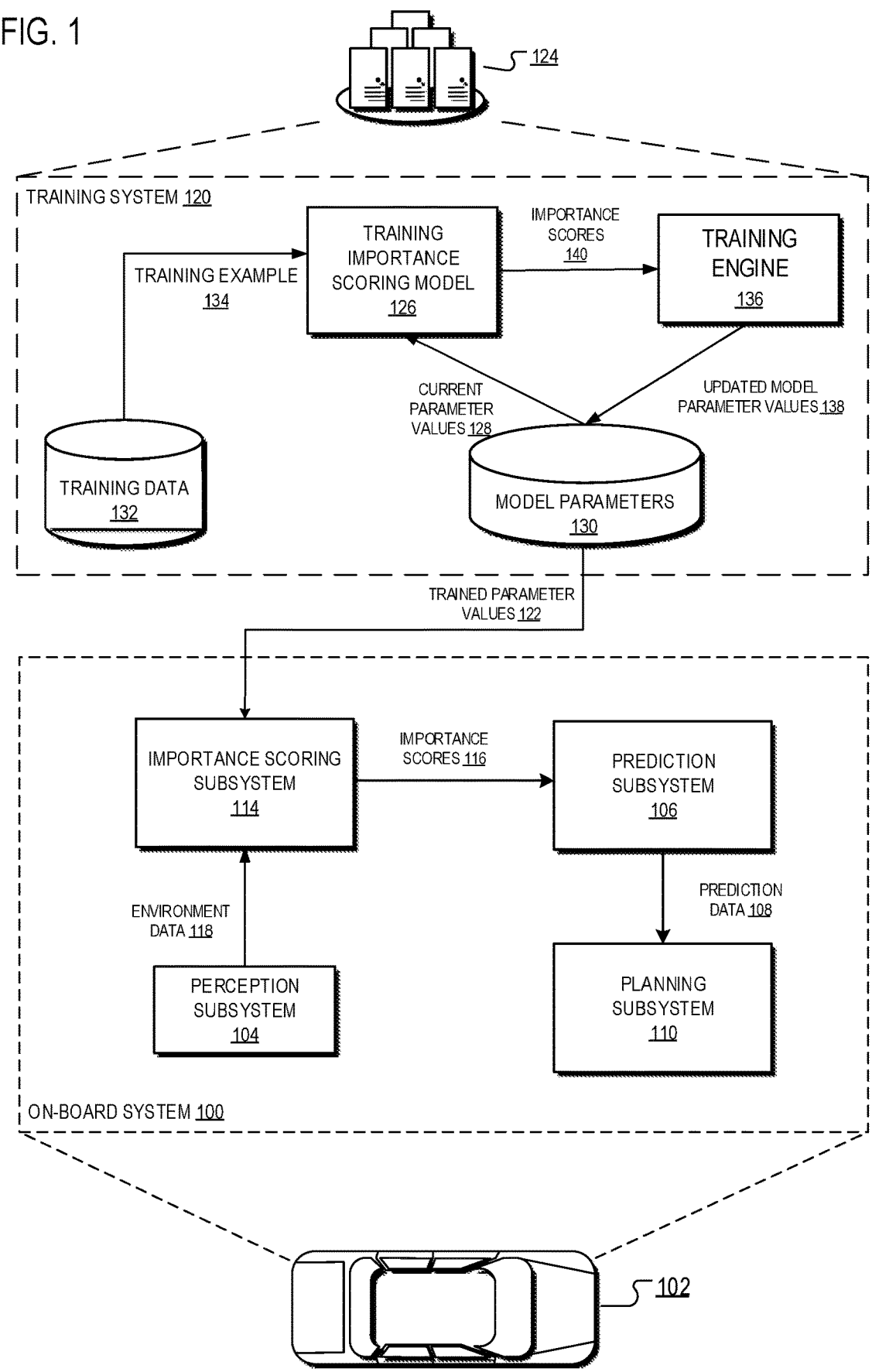
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a control subsystem or a user interface subsystem).

The on-board system 100 includes a perception subsystem 104 which enables the on-board system 100 to "see" the environment in the vicinity of the vehicle 102. More specifically, the perception subsystem 104 includes one or more sensors, some of which are configured to receive reflections of electromagnetic radiation from the environment in the vicinity of the vehicle 102. For example, the perception subsystem 104 can include one or more laser sensors (e.g., LIDAR laser sensors) that are configured to detect reflections of laser light. As another example, the perception subsystem 104 can include one or more radar sensors that are configured to detect reflections of radio waves. As another example, the perception subsystem 104 can include one or more camera sensors that are configured to detect reflections of visible light.

The perception subsystem 104 repeatedly (i.e., at each of multiple time points) captures raw sensor data which can indicate the directions, intensities, and distances travelled by reflected radiation. For example, a sensor in the perception subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In some implementations, based on processing the raw sensor data, the perception subsystem 104 repeatedly generates environment data 118 that characterizes a latest state of an environment (i.e., an environment at the current time point) in the vicinity of the vehicle 102. In particular, the environment data 118 describes any agents (e.g., pedestrians, bicyclists, other vehicles, and the like) that are present in the environment.

The description of an agent may refer to, for example, data defining the spatial position occupied by the agent in the environment and characteristics of the motion of the agent. The characteristics of the motion of an agent can include, for example, the velocity of the agent (e.g., measured in miles per hour—mph), the acceleration of the agent (e.g., measured in feet per second squared), and the heading of the agent (e.g., measured in degrees). The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

The on-board system 100 can provide the environment data 118 generated by the perception subsystem 104 to a prediction subsystem 106.

The on-board system 100 uses the prediction subsystem 106 to continually (i.e., at each of multiple time points) generate prediction data 108 which characterizes some or all of the agents in the vicinity of the vehicle 102. For example, for each of multiple agents in the vicinity of the vehicle 102, the prediction data 108 may be behavior prediction data which generates possible trajectories and defines respective probabilities that the agent makes each of a possible set of intents (e.g., yielding, changing lanes, passing, braking, or accelerating). As another example, for each of the multiple agents in the vicinity of the vehicle 102, the prediction data 108 may be classification prediction data which defines respective probabilities that the agent is each of a predetermined number of possible agent types (e.g., school bus, ambulance, policy officer, construction worker, etc). As yet another example, for each of the multiple agents in the vicinity of the vehicle 102, the prediction data 108 may be semantic prediction data which includes action recognition of the agent (e.g., riding scooter/skateboard, directing traffic, etc).

The on-board system 100 can provide the prediction data 108 generated by the prediction subsystem 106 to a planning subsystem 110.

When the planning subsystem 110 receives the prediction data 108, the planning system 110 can use the prediction data 108 to generate planning decisions which plan the future trajectory of the vehicle 102. The planning decisions generated by the planning subsystem 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning subsystem 110 with prediction data 108 indicating that the future trajectory of another vehicle is likely to cross the future trajectory of the vehicle 102, potentially resulting in a collision. In this example, the planning subsystem 110 can generate a planning decision to apply the brakes of the vehicle 102 to avoid a collision.

The planning decisions 144 generated by the planning subsystem 110 can be provided to a control system (not shown in the figure) of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

In order for the planning subsystem 110 to generate planning decisions which cause the vehicle 102 to travel along a safe and comfortable trajectory, the on-board system 100 must provide the planning subsystem 110 with timely and accurate prediction data 108. However, the prediction subsystem 106 may require substantial computational resources (e.g., memory, computing power, or both) to generate prediction data 108 for an agent in the vicinity of the vehicle. In certain situations, a large number of other agents in the environment may be in the vicinity of the vehicle 102 (e.g., when the vehicle 102 is traveling along a busy highway or a complex urban scenario). In these situations, the limited computational resources available on-board the vehicle 102 may be insufficient for the prediction subsystem 106 to generate timely prediction data 108 for all the agents in the vicinity of the vehicle 102.

To enable the prediction subsystem 106 to generate timely prediction data 108, the on-board system 100 can identify one or more of the agents in the vicinity of the vehicle 102 as "high impact" agents. In some cases, the on-board system 100 identifies only a fraction of the agents in the vicinity of the vehicle 102 as high-impact agents. The prediction subsystem 106 is then configured to generate precise prediction data 108 for the high-impact agents using a prediction model (e.g., a prediction neural network). The prediction subsystem 106 can generate prediction data 108 for any remaining agents which are not identified as high-impact agents, and which will be referred to in this specification as "low impact" agents, using less computationally intensive (but potentially less precise) behavior prediction models. In this specification, a "prediction model" should be understood as implementing a prediction algorithm.

Specifically, the on-board system 100 determines which of the agents in the vicinity of the vehicle 102 to designate as high-impact agents using an importance scoring subsystem 114. The importance scoring subsystem 114 is configured to generate a respective importance score 116 for each agent in the vicinity of the vehicle 102 using an importance scoring model. The importance scoring model can be implemented, for example, as a neural network model, a random forest model, a support vector machine (SVM) model, or as any other type of trainable machine learning model.

More specifically, the importance scoring model is configured to process the environment data 118 in accordance with trained parameter values of the importance scoring model to generate an output that defines the importance scores 116 for the agents in the vicinity of the vehicle 102. The importance score 116 for an agent characterizes an estimated relative impact of the agent on the planning decisions generated by the planning subsystem 110 which plan the future trajectory of the vehicle 102. After generating the importance scores 116, the on-board system 100 can determine one or more of the agents in the vicinity of the vehicle with the highest importance scores to be "high impact" agents. That is, the on-board system 100 ranks the agents in descending order of their respective importance scores 116 and identifies the top one or more agents as "high impact" agents.

In a particular example, at a particular intersection there may be: (i) a sedan that is maneuvering to cut in front of the vehicle 102, and (ii) a bicyclist which is far behind the vehicle 102 and unlikely to affect the planning decisions of the planning system 110. In this example, the importance scoring subsystem 114 may generate a higher importance score for the sedan than for the bicyclist, potentially causing the sedan to be designated a "high impact" agent and the bicyclist a "low impact" agent. By generating prediction data 108 based on the importance scores 116, the on-board system 100 can concentrate its limited computational resources on generating precise prediction data 108 for only those agents which are likely to have the biggest impact on the planning decisions generated by the planning subsystem 110. In this manner, the on-board system 100 can generate timely prediction data 108 which enables the planning subsystem 110 to generate planning decisions that cause the vehicle to travel along a safe and comfortable trajectory despite the limited computational resources available on-board the vehicle 102.

More generally, any processing module of the on-board system (including but not limited to the planning subsystem 110) can use the importance scores 116 to allocate a greater amount of computational resources to processing data characterizing the high-priority agents than the low-priority agents. Such processing module can be, for example, a user interface module that presents data characterizing a surrounding environment to the driver of the vehicle 102.

To allow the importance scoring subsystem 114 to accurately prioritize agents, a training system 120 can determine trained parameter values 122 of the importance scoring model included in the importance scoring subsystem 114. The training system 120 is typically hosted within a data center 124, which can be a distributed computing system having hundreds or thousands of computers in one or more locations.

The training system 120 includes a training importance scoring model 126 that is configured to process an input that includes environment data, e.g., the environment data 118, and generate an output that defines corresponding importance scores 140 for agents that are present in the environment in the vicinity of the vehicle. The training system 120 includes one or more computing devices having software or hardware modules that implement the operations of the training importance scoring model 126. For example, if the training importance scoring model 126 is an importance scoring neural network, then the training system 120 includes one or more computing devices having software or hardware modules that implement the respective operations of each layer of the training importance scoring neural network according to an architecture of the training importance scoring neural network. The training importance scoring model 126 is generally the same model (or almost the same model) as the on-board importance scoring model. For example, if the training importance scoring model is a neural network, then it generally has (at least partially) the same architecture as the on-board importance scoring neural network included in the importance scoring system 114.

The training importance scoring model 126 can compute the operations of the training importance scoring model 126 using current parameter values 128 of parameters stored in a collection of model parameters 130. Although illustrated as being logically separated, the model parameters 130 and the software or hardware modules performing the operations may actually be located on the same computing device or on the same memory device.

The training system 120 trains the training importance scoring model 126 using a training data set 132 which includes multiple training examples 134. In some implementations, each of the training examples 134 may include: (i) data describing one or more agents that are present in an environment, and (ii) for each of the one or more agents, a label defining a ground truth importance score of the agent. The importance score for an agent characterizes an estimated impact of the agent on planning decisions generated by a planning subsystem of the vehicle.

The training examples 134 may be partially obtained from real or simulated driving logs. After obtaining the driving logs, ground truth importance scores for the agents are defined for generating the corresponding label data that is included in each of the training examples 134. Defining respective ground truth importance scores for the agents is a process of attributing corresponding impacts on the planning decisions generated by the planning subsystem 110 to specific agents. An issue common to such process is that at a given time point, multiple agents may be in the vicinity of the vehicle 102, so their exact impacts on the planning decisions are likely to be neglected or incorrectly attributed.

In a particular example, a simulated driving log may characterize that, at a particular time point, there are: (i) a first sedan that is maneuvering to cut in front of the vehicle 102, and (ii) a second sedan further in front of the vehicle 102 that is slowing down. In addition, according to the log, the vehicle 102 is applying the brake. In this example, it would be challenging to determine to what extent each sedan contributes to the vehicle's planning decision of applying the brake. And in turn, in practice it would therefore be difficult to precisely define respective importance scores for the first and second sedans.

Therefore, the training examples 134, or more specifically, the corresponding label data included in the training examples 134, are generated using an incremental processing technique. Generating training examples using the technique will be described in more detail below with respect to FIGS. 2-4.

The training importance scoring model 126 can process the inputs from the training examples 134 to generate, for each training example 134, an output which defines respective importance scores 140. A training engine 136 compares importance scores 140 to the ground truth importance scores of the agents defined by the labels in the training examples 134. For example, when the training importance scoring model 126 is a neural network, the training engine 136 can compute gradients of a loss function that characterizes discrepancies between the importance scores 140 and the ground truth importance scores of the agents defined by the labels in the training examples 134. The training engine 126 can use the gradients to generate updated model parameter values 138 for the neural network.

The training engine 136 generates updated model parameter values 138 by using an appropriate machine learning training technique (e.g., stochastic gradient descent). The training engine 136 can then update the collection of model parameters 130 using the updated model parameter values 138.

After training is complete, the training system 120 can provide a set of trained parameter values 122 to the on-board system 100 for use in generating importance scores by the importance scoring subsystem 114 that enables the real-time identification of the most important agents in a vicinity of the vehicle 102. The training system 120 can provide the set of trained parameter values 122 by a wired or wireless connection to the on-board system 100. In this manner, the prediction subsystem 108 can generate timely and accurate prediction data 108 despite the limited computational resources available on-board the vehicle 102.

Figure 2:
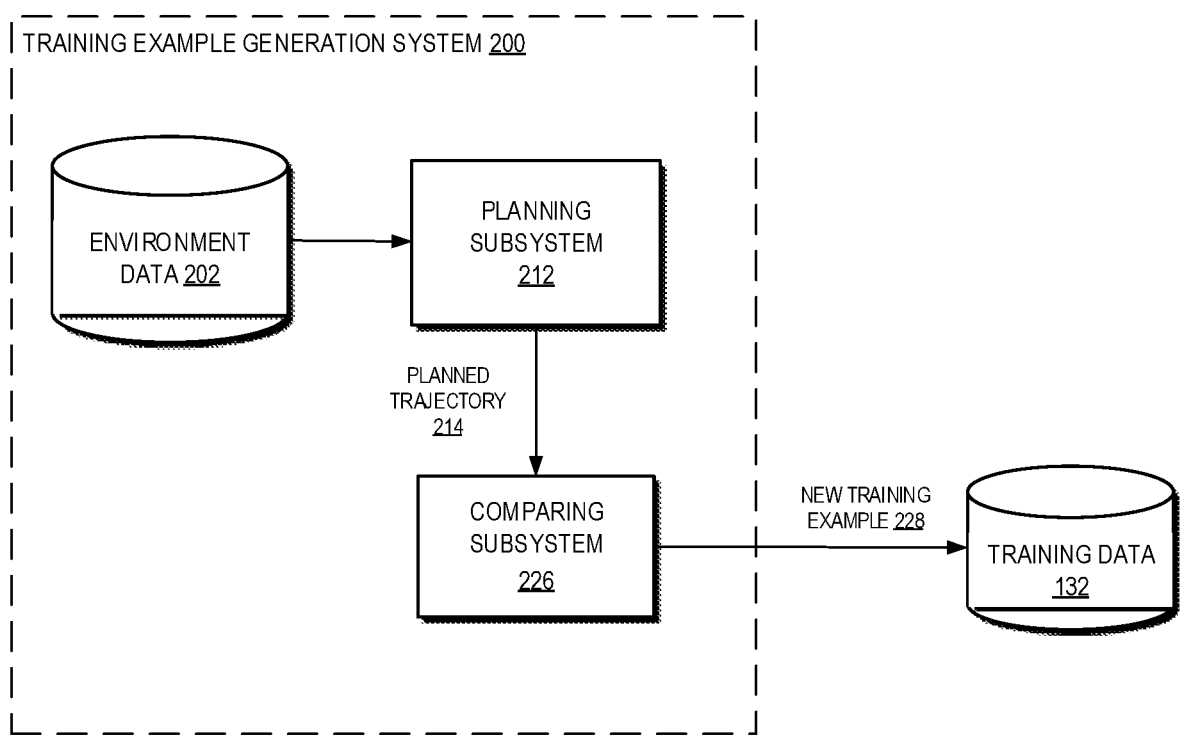
FIG. 2 is a block diagram of an example training example generation system.

FIG. 2 is a block diagram of an example training example generation system 200. The training example generation system 200 is an example of systems implemented as computer programs on one or more computers in one or more locations in which the systems, components, and techniques described below are implemented.

The training example generation system 200 maintains (e.g., in a physical data storage device) a set of environment data 202. The environment data 202 can be obtained from real or simulated driving logs.

A real driving log stores environment data 118 that are continually generated by the perception subsystem 104 onboard the vehicle 102 as the vehicle navigates through real-world environments. As described with reference to FIG. 1, the environment data 118 may be generated by one or more sensors of the vehicle, including one or more of: laser sensors, radar sensors, and camera sensors.

A simulated driving log stores simulated environment data. Simulated environment data is generated by a software simulation of the environment. That is, the simulated environment data simulates sensor data that would be generated by sensors of a vehicle.

Each environment data 202, whether real or simulated, characterizes a state of an environment (i.e., an environment at a given time point). Specifically, an environment data 202 may include data describing one or more agents that are present in the environment.

In some implementations, the environment data 202 further includes precise prediction data (e.g., behavior, classification, and semantic prediction data) for the agents. The precise prediction data is typically generated using computationally expensive prediction models.

The training example generation system 200 includes a planning subsystem 212 and a comparing subsystem 226. Optionally, the planning subsystem 212 is the same planning subsystem 110 included in the onboard system 100 of the vehicle 102. That is, both planning subsystems 110 and 212 include the same planning model.

A planning model is software that is configured to receive an environment data 202, data derived from the environment data 202, or both and generate a corresponding planned trajectory 214 for a vehicle navigating through the environment. Typically, a planned trajectory 214 defines a path in the environment along which the vehicle 102 will travel along within a certain period of time in the future (e.g., within the next 5 seconds after the current time point).

In some cases, the planning model included in the planning subsystem 212 can be implemented as a cost-based planning model, i.e., a model that plans future trajectories based on optimizing one or more predetermined cost functions under a set of constraints. Such constraints may be imposed by, for example, the environment, the agents that are present in the environment, the vehicle 102 itself, and so on. The cost function can be computed with respect to a total amount of time or energy that is consumed by the vehicle 102 upon completion of a planned trajectory. Alternatively, the cost function can be computed with respect to a level of comfort, safety, or any other suitable metrics of the trajectory.

The comparing subsystem 226 is configured to determine a measure of difference between any two planned trajectories. In general, the measure of difference can be determined based on any of a variety of metrics. For example, the comparing subsystem 226 can compute an Euclidean distance between the two planned trajectories. In some implementations, computing the Euclidean distance involves computing a Euclidean inner product between respective geometric representations (e.g., vectors) that represent the two trajectories.

As another example, the comparing subsystem 226 can determine a difference between respective costs of the two planned trajectories. The costs are computed using a given cost function. For instance, if the cost function is computed with respect to energy (e.g., gas or battery power) consumption, the comparing subsystem 226 can then compare a difference between respective amounts of energy consumed by the vehicle 102 upon completion of the two trajectories.

As another example, the comparing subsystem 226 can determine respective differences between corresponding geometries and speeds of the two planned trajectories. That is, the comparing subsystem 226 separately determines corresponding differences between the trajectories in geographical space (e.g., using dynamic time warping (DTW) algorithm) and time space. Optionally, the subsystem 226 determines a combined measure of difference based on the geographical and time differences.

The system 200 uses the planning model and the comparing subsystem to generate new training examples 228 from obtained environment data. Specifically, each new training example 228 includes: (i) data describing agents that are present in the environment at a given time, and (ii) for each of the one or more agents, a label defining a ground truth importance score of the agent. Generating new training examples 228 is described in more detail below with reference to FIG. 3.

The system 200 submits, e.g., via a data communication network, the new training example 228 to the training data set 132 that is located in the training system 120. Referring back to FIG. 1, the training engine 136 included in the training system 120 can then train the training importance scoring model 126 to determine respective importance scores for the agents in a vicinity of the vehicle, and, correspondingly, identify the most important agents in real-time using the new training examples 228.

Figure 3:
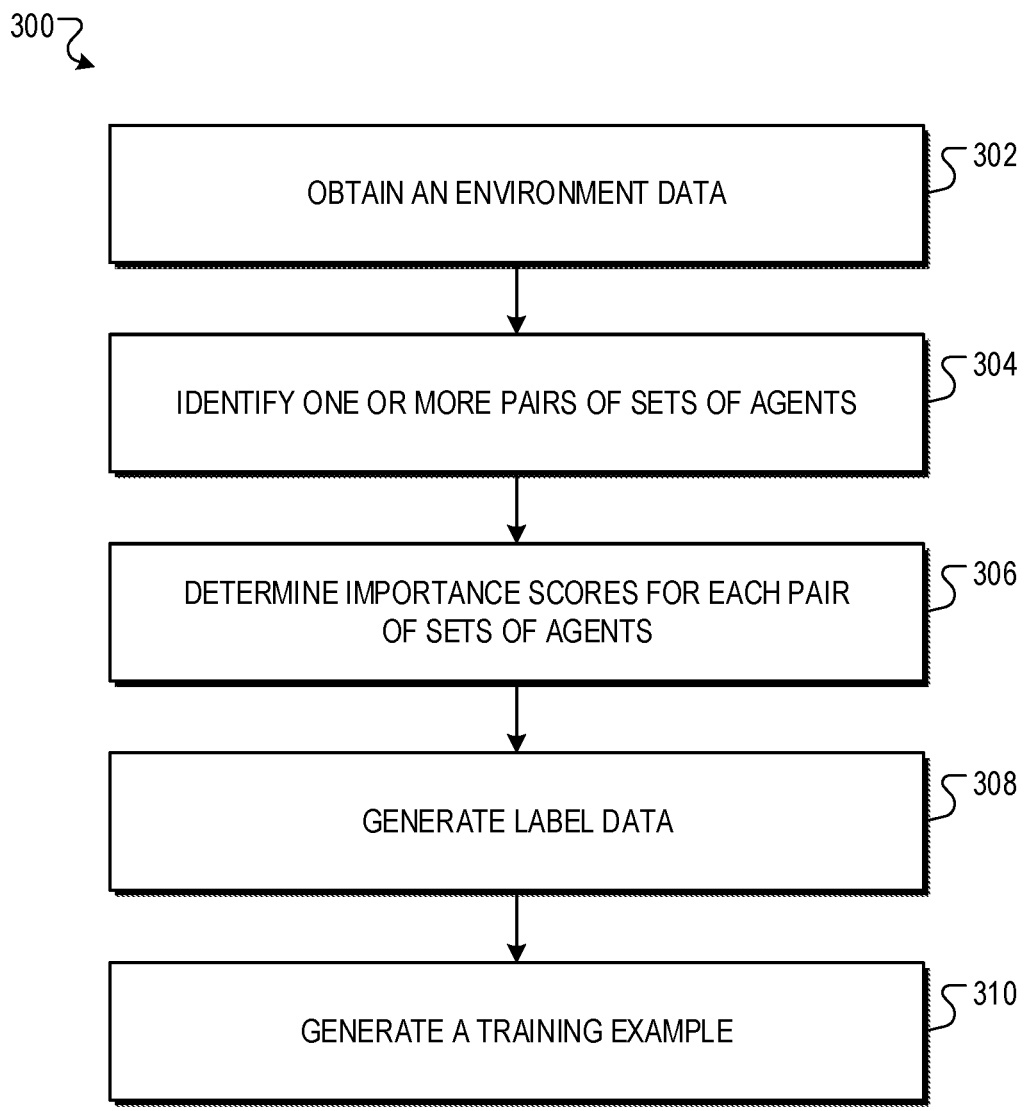
FIG. 3 is a flow diagram of an example process for generating a training example.

FIG. 3 is a flow diagram of an example process 300 for generating a training example. For convenience, the process 300 will be described as being performed by a system of one or more computers located in one or more locations. For example, a training data generation system, e.g., the training data generation system 200 of FIG. 2, appropriately programmed in accordance with this specification, can perform the process 300.

The system obtains an environment data (302) from real or simulated driving logs. The environment data characterizes a state of an environment (i.e., an environment at a given time point). Specifically, the environment data may include data describing one or more agents that are present in the environment.

Figure 5:
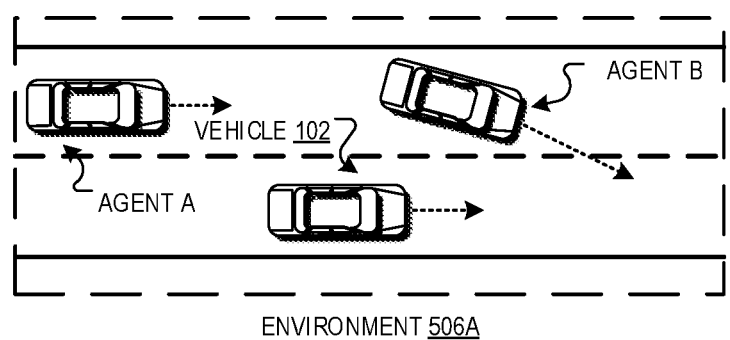
FIG. 5 illustrates example environments in a vicinity of the vehicle.
Figure 5:
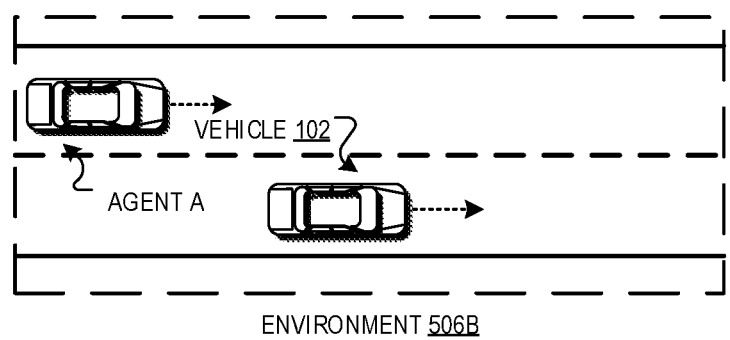

Referring now to FIG. 5 which illustrates example environments in a vicinity of the vehicle 102. As a particular example of an environment within a vicinity of the vehicle 102, environment 406A is a roadway that includes two sedans denoted Agent A and B. In particular, Agent A is traveling parallel to the vehicle 102, and Agent B is maneuvering to cut in front of the vehicle 102. While Agent B is likely to have a greater impact on the planning decisions generated by the planning subsystem 110 of the vehicle 102, to what extent Agent B affects the planned trajectory, i.e., relative to Agent A, would be difficult to determine simply by viewing the state of the environment. In this environment and other similar environments, the system repeatedly performs some or all of the steps within the process 300 to determine a corresponding importance score of each agent that is present in the environment.

The system identifies one or more pairs of sets of agents (304). In general, each set may include some or all of the agents that are present in the environment. Optionally, a set may be an empty set, i.e., none of the agents are included.

In particular, for each pair of sets of agents, one set is a subset of the other. That is, a second set of agents can include (i) all of the agents that are in a first set of agents and (ii) one or more agents that are not in a first set of agents. Alternatively, a second set of agents can include all of the agents that are in a first set of agents less one or more agents.

As a particular example, if there are N agents present in the environment that need to be labeled, the system can generate N pairs of sets of agents: [0], [1]; [1], [1, 2]; . . . [1, . . . , N−1], [1, . . . N], where [0] denotes the empty set and [1, . . . , N−1], for example, denotes the set that includes the agents with indices 1 through N−1, i.e., includes all agents except for the agent with index N. That is, for each given agent of the N agents, the system generates a pair of sets that includes a first set with zero or more other agents and a second set that includes all of the other agents in the first set and the given agent.

The system determines importance scores (306) for each pair of sets of agents. In some implementations, for each pair, the system determines corresponding importance scores for the agents that are only in one of the two sets of agents. This step is described in more detail below with respect to FIG. 4.

The system generates label data (308) that includes a corresponding label for each of the one or more agents that are present in the environment. Each label defines an importance score that has been determined for a particular agent. In the particular example given above, the label for a particular agent is the importance score for the pair of sets that includes a first set with zero or more other agents and a second set that includes all of the other agents in the first set and the particular agent.

The system generates a training example (310) based on the environment and label data. Specifically, the training example includes: (i) data describing agents that are present in the environment, and (ii) for each of the one or more agents, a label defining an importance score of the agent.

Figure 4:
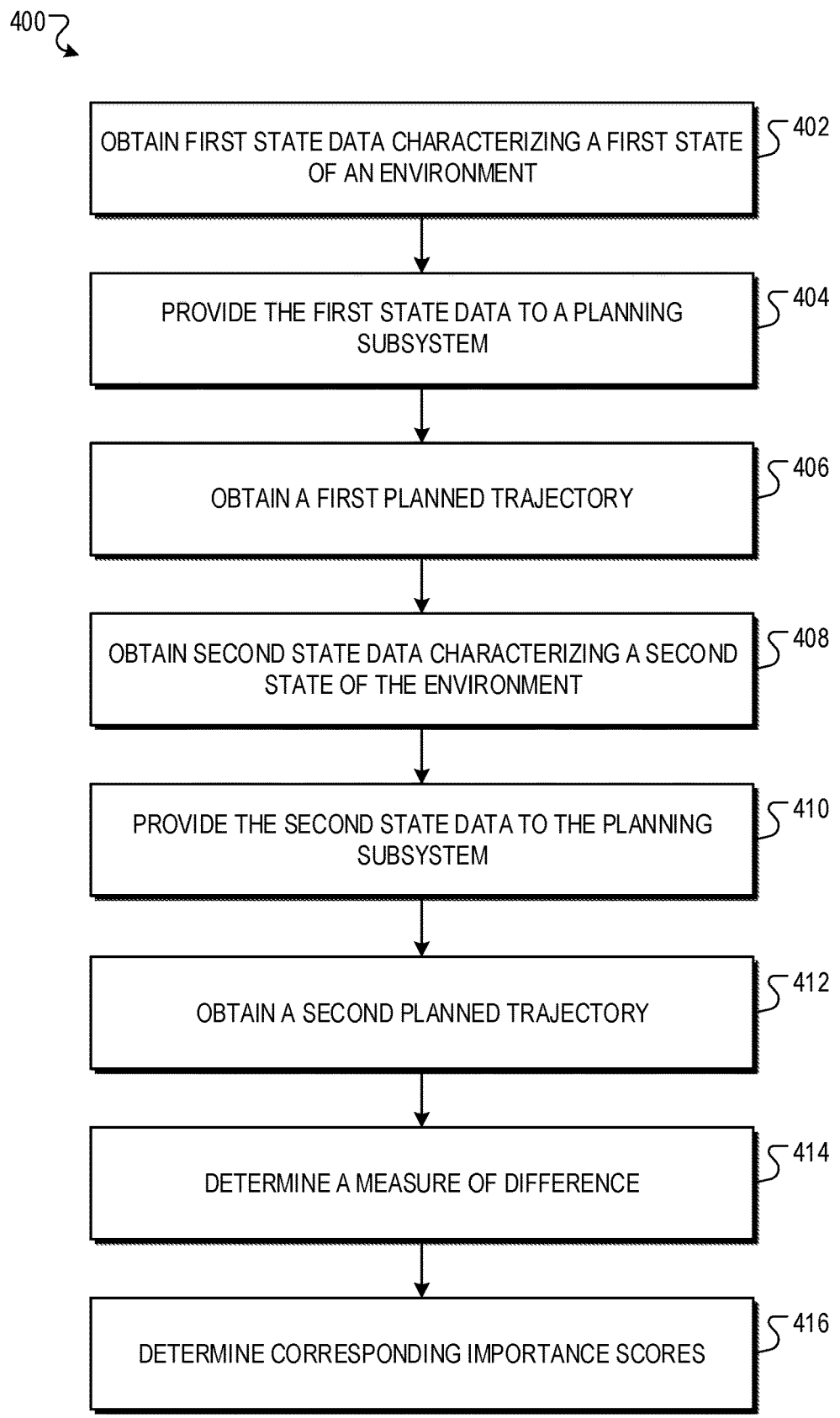
FIG. 4 is a flow diagram of an example process for determining respective importance scores for a plurality of agents in a vicinity of the vehicle.

FIG. 4 is a flow diagram of an example process 400 for determining respective importance scores for a plurality of agents in a vicinity of a vehicle. For convenience, the process 400 will be described as being performed by a system of one or more computers located in one or more locations. For example, a training data generation system, e.g., the training data generation system 200 of FIG. 2, appropriately programmed in accordance with this specification, can perform the process 400.

The system obtains a first state data characterizing a first state of the environment (402). Specifically, the system obtains a first environment data from real or simulated driving logs. The first environment data includes data describing a first set of agents that are located within a vicinity of the vehicle. Optionally, the first set may be an empty set, i.e., no agents are located within a vicinity of the vehicle.

In the particular example depicted in FIG. 5, environment 506A shows a first state of the roadway environment in which Agent A is travelling parallel to the vehicle 102, while Agent B is maneuvering to cut in front of the vehicle 102. In other words, the first set of agents within the obtained first environment data includes Agent A and B.

The system provides the first state data to the planning subsystem (404). The planning subsystem is configured to generate planning decisions which plan a future trajectory of the vehicle. The planning decisions generated by the planning subsystem can, for example, include: yielding (e.g., to other vehicles), stopping (e.g., at a Stop sign), passing other vehicles, adjusting vehicle lane position to accommodate a bicyclist, slowing down in a school or construction zone, merging (e.g., onto a highway), and parking. Accordingly, such planning decisions would change the planned future trajectory of the vehicle.

The system obtains a first planned trajectory (406) as a first output from the planning subsystem. Typically, a planned trajectory defines a path in the environment along which the vehicle will travel along within a certain period of time in the future (e.g., within the next 5 seconds after the current time point).

The system obtains a second state data characterizing a second state of the environment (408). As described above, the system obtains a second environment data from real or simulated driving logs. The second environment data includes data describing a second set of agents that are located within a vicinity of the vehicle. Optionally, the second set may be an empty set, i.e., no agents are located within a vicinity of the vehicle.

In particular, the first and second states of the environment characterize a same scene in a vicinity of the vehicle except with different numbers of agents that are present in the scene. In some implementations, the system obtains such second state data from the set of environment data that is maintained by the system. In some implementations, the system obtains the second state data by modifying the first state data to either (i) add corresponding data that describes the new agents, or (ii) remove corresponding data that describes the existing agents. In this manner, the second set of agents can include (i) all of the agents that are in the first set of agents and (ii) one or more agents that are not in the first set of agents. Alternatively, the second set of agents can include all of the agents that are in the first set of agents less one or more agents.

In the particular example depicted in FIG. 5, environment 506B shows a second state of the roadway environment (i.e., the same roadway as environment 506A) in which Agent A is travelling in parallel to the vehicle 102. In other words, the second set of agents within the obtained second environment data includes Agent A.

The system provides the second state data to the planning subsystem (410).

The system obtains a second planned trajectory (412) as a second output from the planning subsystem.

The system determines a measure of difference (414) in the first and second planned trajectories based on any of a variety of metrics. Such metrics may include, for example, Euclidean distance, cost computed using a predetermined cost function, geometry, speed, and so on. In general, the measure of difference approximates to what extent the one or more agents that are in only one of the two sets of agents have contributed to the planning decisions that change the planned trajectory.

The system determines corresponding importance scores (416) for the one or more agents that are only in one of the two sets of agents. That is, the system can determine corresponding ground truth importance scores for the one or more agents that are in the second set of agents but not in the first set of agents. Alternatively, the system can determine corresponding ground truth importance scores for the one or more agents that are in the first set of agents but not in the second set of agents. In general, the ground truth importance score is (at least partially) proportional to the determined measure of difference.

In the particular example depicted in FIG. 5, the system determines a corresponding importance score for Agent B which is only in the first set of agents. The importance score characterizes a relative impact of Agent B on planned trajectories generated by the planning subsystem of the vehicle 102. For example, if the measure of difference in the previous step is based on Euclidean distance and is computed to be 10, the system may determine the importance score for Agent B to be 10.

In some cases where there are more than one agents that are only in one of the two sets of agents, the system can assign a same ground truth importance score to each such agent. That is, such agents may be understood to have an equivalent impact on the planning decisions. Alternatively, the system repeats the steps 408-416 to determine a corresponding importance score for each such agent, e.g., by obtaining a state data characterizing a state of the environment in which one such agent is not present.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computed-implemented method comprising:
  generating training data for an importance scoring machine learning model configured to process an input comprising data describing a plurality of agents that are present in a scene of an environment and to generate one or more outputs that define a respective importance score for each of the plurality of agents, wherein generating the training data comprises:
    obtaining first state data characterizing a first state of the environment with a first set of the plurality of agents being present in the scene of the environment with the autonomous vehicle at a particular time point;
    providing a first planning subsystem input comprising the first state data to the planning subsystem of the autonomous vehicle;
    in response to providing the first planning subsystem input obtaining from the planning subsystem a first planning subsystem output comprising data that defines a first planned trajectory to be followed by the autonomous vehicle after the particular time point;
    obtaining second state data characterizing a second state of the environment with a second set of the plurality of agents being present in the scene of the environment with the autonomous vehicle at the particular time point, wherein the second set of the plurality of agents includes (i) all of the agents that are in the first set of the plurality of agents and (ii) one or more agents that are not in the first set of the plurality of agents;
    providing a second planning subsystem input comprising the second state data to the planning subsystem;
    in response to providing the second planning subsystem input, obtaining from the planning subsystem a second planning subsystem output comprising data that defines a second planned trajectory to be followed by the autonomous vehicle after the particular time point;
    determining a measure of a difference between (i) the first planned trajectory to be followed by the autonomous vehicle after the particular time point and (ii) the second planned trajectory to be followed by the autonomous vehicle after the particular time point;
    determining, based at least in part on the determined measure of difference, a respective importance score for each of the one or more agents that are in the second set of the plurality of agents but not in the first set of the plurality of agents, wherein the respective importance score characterizes, for each of the one or more agents that are in the second set of the plurality of agents but not in the first set of the plurality of agents, a relative impact of the agent on the first planned trajectory generated by the planning subsystem of the autonomous vehicle; and
    generating the training data that includes (i) data describing the one or more agents that are in the second set of the plurality of agents but not in the first set of the plurality of agents, and (ii) for each of the one or more agents that are the second set of the plurality of agents but not in the first set of the plurality of agents, a label defining the respective importance score for the agent as a ground truth importance score of the agent; and
  training the importance scoring machine learning model on the training data.

2. The method of claim 1, wherein generating the training data further comprises:
  obtaining third state data characterizing a third state of the environment with a third set of the plurality of agents being present in the scene of the environment with the autonomous vehicle, wherein the third set of the plurality of agents includes all of the agents that are in the first set of the plurality of agents less one or more agents;
providing a third planning subsystem input comprising the third state data to the planning subsystem;
obtaining from the planning subsystem a third planning subsystem output comprising data that defines a third planned trajectory to be followed by the autonomous vehicle after the particular time point;
determining a measure of a difference between the first and third planned trajectories; and
determining, based at least on the determined measure of difference, a respective importance score for each of the one or more agents that are in the first set of the plurality of agents but not in the third set of the plurality of agents.

3. The method of claim 1, wherein the first and second states of the environment characterize the scene of the environment except with different numbers of agents that are present in the scene of the environment.

4. The method of claim 3, wherein the scene of the environment is a scene of a simulated environment.

5. The method of claim 3, wherein the scene of the environment is a scene of a real world environment that is perceived by one or more sensors onboard the autonomous vehicle.

6. The method of claim 1, wherein determining the measure of the difference between the first and second planned trajectories comprises:
determining a Euclidean distance between the first and second planned trajectories.

7. The method of claim 1, wherein the planning subsystem of the autonomous vehicle is a cost-based planning subsystem, and wherein determining the measure of the difference between the first and second planned trajectories comprises:
determining a difference between respective costs of the first and second planned trajectories that are both generated by the cost-based planning subsystem.

8. The method of claim 1, wherein determining the measure of the difference between the first and second planned trajectories comprises:
determining respective differences between corresponding geometries and speeds of the first and second planned trajectories.

9. A system comprising:
one or more computers; and
one or more storage devices storing instructions that, when executed by the one or more computers, cause the one or more computers to perform operations comprising:
generating training data for an importance scoring machine learning model configured to process an input comprising data describing a plurality of agents that are present in a scene of an environment and to generate one or more outputs that define a respective importance score for each of the plurality of agents, wherein generating the training data comprises:
obtaining first state data characterizing a first state of the environment with a first set of the plurality of agents being present in the scene of the environment with the autonomous vehicle at a particular time point;
providing a first planning subsystem input comprising the first state data to the planning subsystem of the autonomous vehicle;
in response to providing the first planning subsystem input, obtaining from the planning subsystem a first planning subsystem output comprising data that defines a first planned trajectory to be followed by the autonomous vehicle after the particular time point;
obtaining second state data characterizing a second state of the environment with a second set of the plurality of agents being present in the scene of the environment with the autonomous vehicle at the particular time point, wherein the second set of the plurality of agents includes (i) all of the agents that are in the first set of the plurality of agents and (ii) one or more agents that are not in the first set of the plurality of agents;
providing second planning subsystem input comprising the second state data to the planning subsystem;
in response to providing the second planning subsystem input obtaining from the planning subsystem a second planning subsystem output comprising data that defines a second planned trajectory to be followed by the autonomous vehicle after the particular time point;
determining a measure of a difference between (i) the first planned trajectory to be followed by the autonomous vehicle after the particular time point and (ii) the second planned trajectory to be followed by the autonomous vehicle after the particular time point;
determining, based at least in part on the determined measure of difference, a respective importance score for each of the one or more agents that are in the second set of the plurality of agents but not in the first set of the plurality of agents, wherein the respective importance score characterizes, for each of the one or more agents that are in the second set of the plurality of agents but not in set of the plurality of agents, a relative impact of the agent on the first planned trajectory generated by the planning subsystem of the autonomous vehicle; and
generating the training data that includes (i) data describing the one or more agents that are in the second set of the plurality of agents but not in the first set of the plurality of agents, and (ii) for each of the one or more agents that are in the second set of the plurality of agents but not in the first set of the plurality of agents, a label defining the respective importance score for the agent as a ground truth importance score of the agent; and
training the importance scoring machine learning model on the training data.

10. The system of claim 9, wherein generating the training data further comprises:
obtaining third state data characterizing a third state of the environment with a third set of the plurality of agents being present in the scene of the environment with the autonomous vehicle, wherein the third set of the plurality of agents includes all of the agents that are in the first set of the plurality of agents less one or more agents;
providing a third planning subsystem input comprising the third state data to the planning subsystem;
obtaining from the planning subsystem a third planning subsystem output comprising data that defines a third planned trajectory to be followed by the autonomous vehicle after the particular time point;
determining a measure of a difference between the first and third planned trajectories; and
determining, based at least on the determined measure of difference, a respective importance score for each of the one or more agents that are in the first set of the plurality of agents but not in the third set of the plurality of agents.

11. The system of claim 9, wherein the first and second states of the environment characterize the scene of the environment except with different numbers of agents that are present in the scene of the environment.

12. The system of claim 11, wherein the scene of the environment is a scene of a simulated environment.

13. The system of claim 11, wherein the scene of the environment is a scene of a real world environment that is perceived by one or more sensors onboard the autonomous vehicle.

14. The system of claim 9, wherein determining the measure of the difference between the first and second planned trajectories comprises:
determining a Euclidean distance between the first and second planned trajectories.

15. The system of claim 9, wherein the planning subsystem of the autonomous vehicle is a cost-based planning subsystem, and wherein determining the measure of the difference between the first and second planned trajectories comprises:
determining a difference between respective costs of the first and second planned trajectories that are both generated by the cost-based planning subsystem.

16. The system of claim 9, wherein determining the measure of the difference between the first and second planned trajectories comprises:
determining respective differences between corresponding geometries and speeds of the first and second planned trajectories.

17. One or more non-transitory computer storage media storing instructions that when executed by one or more computers cause the one or more computers to perform operations comprising:
generating training data for an importance scoring machine learning model configured to process an input comprising data describing a plurality of agents that are present in a scene of an environment and to generate one or more outputs that define a respective importance score for each of the plurality of agents, wherein generating the training data comprises:
obtaining first state data characterizing a first state of the environment with a first set of the plurality of agents being present in the scene of the environment with the autonomous vehicle at a particular time point;
providing a first planning subsystem input comprising the first state data to the planning subsystem of the autonomous vehicle;
in response to providing the first planning subsystem input, obtaining from the planning subsystem a first planning subsystem output comprising data that defines a first planned trajectory to be followed by the autonomous vehicle after the particular time point;
obtaining second state data characterizing a second state of the environment with a second set of the plurality of agents being present in the scene of the environment with the autonomous vehicle at the particular time point, wherein the second set of the plurality of agents includes (i) all of the agents that are in the first set of the plurality of agents and (ii) one or more agents that are not in the first set of the plurality of agents;
providing a second planning subsystem input comprising the second state data input to the planning subsystem;
in response to providing the second planning subsystem input, obtaining from the planning subsystem a second planning subsystem output comprising data that defines a second planned trajectory to be followed by the autonomous vehicle after the particular time point;
determining a measure of a difference between (i) the first planned trajectory to be followed by the autonomous vehicle after the particular time point and (ii) the second planned trajectory to be followed by the autonomous vehicle after the particular time point;
determining, based at least in part on the determined measure of difference, a respective importance score for each of the one or more agents that are in the second set of the plurality of agents but not in the first set of the plurality of agents, wherein the respective importance score characterizes, for each of the one or more agents that are in the second set of the plurality of agents but not in the first set of the plurality of agents, a relative impact of the agent on the first planned trajectory generated by the planning subsystem of the autonomous vehicle; and
generating the training data that includes (i) data describing the one or more agents that are in the second set of the plurality of agents but not in the first set of the plurality of agents, and (ii) for each of the one or more agents that are in the second set of the plurality of agents but not in the first set of the plurality of agents, a label defining the respective importance score for the agent as a ground truth importance score of the agent; and
training the importance scoring machine learning model on the training data.

18. The non-transitory computer storage media of claim 17, wherein generating the training data further comprises:
obtaining third state data characterizing a third state of the environment with a third set of the plurality of agents being present in the scene of the environment with the autonomous vehicle, wherein the third set of the plurality of agents includes all of the agents that are in the first set of the plurality of agents less one or more agents;
providing a third planning subsystem input composing the third state data to the planning subsystem;
obtaining from the planning subsystem a third planning subsystem output comprising data that defines a third planned trajectory to be followed by the autonomous vehicle after the particular time point;
determining a measure of a difference between the first and third planned trajectories; and
determining, based at least on the determined measure of difference, a respective importance score for each of the one or more agents that are in the first set of the plurality of agents but not in the third set of the plurality of agents.

* * * * *